No. 887,393. PATENTED MAY 12, 1908.
F. A. HASELWANDER.
HYDROCARBON ENGINE.
APPLICATION FILED AUG. 29, 1905.

WITNESSES:
Henry J. Suhrbier.
Elsa Newbury

INVENTOR
Friedrich August Haselwander
BY
ATTORNEYS.

No. 887,393. PATENTED MAY 12, 1908.
F. A. HASELWANDER.
HYDROCARBON ENGINE.
APPLICATION FILED AUG. 29, 1905.

WITNESSES:

INVENTOR
Friedrich August Haselwander
BY
ATTORNEYS.

No. 887,393. PATENTED MAY 12, 1908.
F. A. HASELWANDER.
HYDROCARBON ENGINE.
APPLICATION FILED AUG. 29, 1905.

WITNESSES:
Henry J. Sulsbier.
Elsa Newbury

INVENTOR
Friedrich August Haselwander
BY
Gower Gower
ATTORNEYS.

No. 887,393. PATENTED MAY 12, 1908.
F. A. HASELWANDER.
HYDROCARBON ENGINE.
APPLICATION FILED AUG. 29, 1905.

WITNESSES:
Henry J. Suhrbier.
Elsa Newbury

INVENTOR
Friedrich August Haselwander
BY
ATTORNEYS.

No. 887,393. PATENTED MAY 12, 1908.
F. A. HASELWANDER.
HYDROCARBON ENGINE.
APPLICATION FILED AUG. 29, 1905.

WITNESSES:
Henry J. Buhrbier.
Elsa Newbury

INVENTOR
Friedrich August Haselwander
BY
ATTORNEYS.

No. 887,393. PATENTED MAY 12, 1908.
F. A. HASELWANDER.
HYDROCARBON ENGINE.
APPLICATION FILED AUG. 29, 1905.

WITNESSES:
Henry J. Buhrlier.
Elsa Newbury

INVENTOR
Friedrich August Haselwander
BY Granier Goepel
ATTORNEYS.

UNITED STATES PATENT OFFICE.

FRIEDRICH AUGUST HASELWANDER, OF RASTATT, GERMANY.

HYDROCARBON-ENGINE.

No. 887,393.

Specification of Letters Patent.

Patented May 12, 1908.

Application filed August 29, 1905. Serial No. 276,234.

*To all whom it may concern:*

Be it known that I, FRIEDRICH AUGUST HASELWANDER, a citizen of the Empire of Germany, residing at Rastatt, in the Empire of Germany, have invented certain new and useful Improvements in Hydrocarbon-Engines, of which the following is a specification.

My invention relates to improvements in hydrocarbon engines, either combustion-engines or explosion-engines, whereby it is rendered possible to introduce the combustible or other gaseous or vaporous or solid materials, either alone or mixed with other materials, into the compressed air and to mix them therewith in the chamber of combustion or explosion without the aid of any special air-pump.

The principle of my improvements is to provide a rib or step extending to the cylindrical inside of the cylinder, either on the piston or on the cover, and a face parallel to said rib or step on the opposite part, either the cover or the piston respectively, the said rib or step being arranged to divide the space between piston and cover into two or three parts during a period before the piston reaches the end of its compression stroke.

Another improvement is to provide one or two communicating channels, which connects or connect the two or three parts of the space.

Other improvements will be fully described and explained with reference to the accompanying drawings, in which—

Similar letters of reference refer to similar parts throughout the several views.

Figures 1, 2, 3:
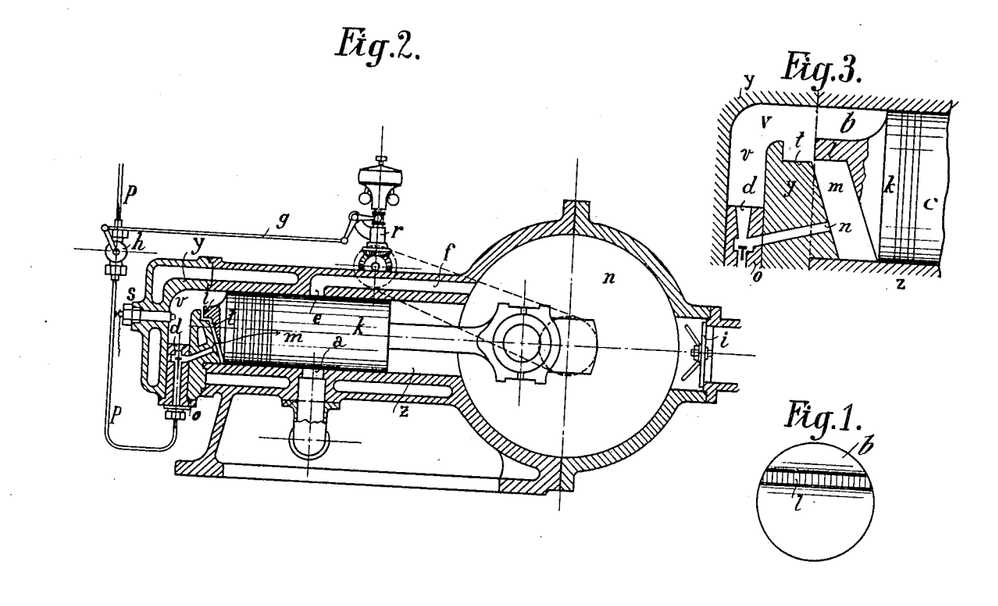
Figure 1 is an end view of the piston of a two-cycle hydrocarbon engine constructed in accordance with the invention.
Fig. 2 is a vertical longitudinal section of the engine,
Fig. 3 is an enlarged detail longitudinal section of a part of the engine.

As is well known, in most of the two-cycle hydrocarbon engines the piston controlling the admission of the air and the escape of the waste gases is provided with a "deflector" $b$ on the side of the air-inlets for guiding the air, which is admitted into the cylinder through the said inlets. The section of this deflector $b$ in the cross direction of the cylinder is a segment, see Fig. 1, which represents an end view of the piston. This deflector $b$ I also use in a two-cycle hydrocarbon engine, such as is shown at Figs. 2 and 3 and I provide the piston $k$ on the side opposite to the cover $y$ with a cross rib $l$, the one side of which is a part of the said deflector $b$. On the side of the rib $l$ opposite to the deflector $b$ I may provide the piston with an inclined face $c$ and also the cover $y$ with a parallel inclined face. The rib $l$ is made of a sufficient height (in the longitudinal direction of the cylinder $z$) to form a space $m$ of a convenient size, the moment the end face of the rib $l$ is in the plane of the corner formed on the cover by the inclined face and the recess $t$ in which the latter rib $l$ engages, see Fig. 3. The longitudinal face of the recess $t$ is so disposed as to leave a narrow slit between the rib $l$ and the cover $y$, which slit is obviously necessary for practical reasons. The cover $y$ is shown as provided with a bore in which a block $o$ is fitted. This block $o$ is provided with a nozzle $d$ and a valve of any known construction and above this valve a communication is established on the one hand with the chamber of combustion $v$ through the nozzle $d$ and on the other hand with the space $m$ through a channel $n$. The engine shown in Fig. 2 is provided with a closed crank space $u$, an air suction valve $i$, a channel $f$ with the air-inlet $e$, an exhaust-port $a$, a tube $p$ for the supply of the combustible, an electrical igniting device $s$ and a governor $r$, which controls a valve or cock $h$ in the fuel-supply tube or pipe by means of a rod $g$.

The hydrocarbon engine operates as follows: During the outward stroke from left to right the piston $k$ compresses the air within the crank space $u$ as usual, until before the end of its stroke it uncovers first the outlet $a$ and afterwards the inlet $e$. The waste combustion products escape through the outlet $a$ and the compressed air passing through the channel $f$ enters the cylinder $z$ while being deflected by the deflector $b$ towards the cover $y$, after which it expels the rest of the waste gases through the outlet $a$. The combustible may be supplied for example from a reservoir above the engine, so that the head of the combustible in the tube $p$ will open the valve in the nozzle $d$ and a certain quantity, which is regulated by the governor $r$, will enter the nozzle $d$ above the valve. During the following inward stroke from right to left the piston $k$ sucks air through the opened valve $i$ into the crank space $u$ and at the same time it further compresses the air within the cylinder $z$ between it and the cover $y$. Before the end of the inward stroke the cross rib $l$ will divide the compressed air, (Fig. 3) so that the air contained in the space $m$ will be much more compressed than in the combustion chamber $v$. In consequence of this a small part of the compressed air will escape from the space $m$ direct to the combustion chamber $v$ through the slit, but the greater part of this compressed air will pass through the channel $n$ and carry along with it the combustible contained in the nozzle $d$ and inject it into the compressed air in the chamber $v$. The mixture so formed is then ignited, either by means of the electrical igniting device $s$ or owing to the temperature produced by the compression, when the combustion or explosion will take place.

Figure 4:
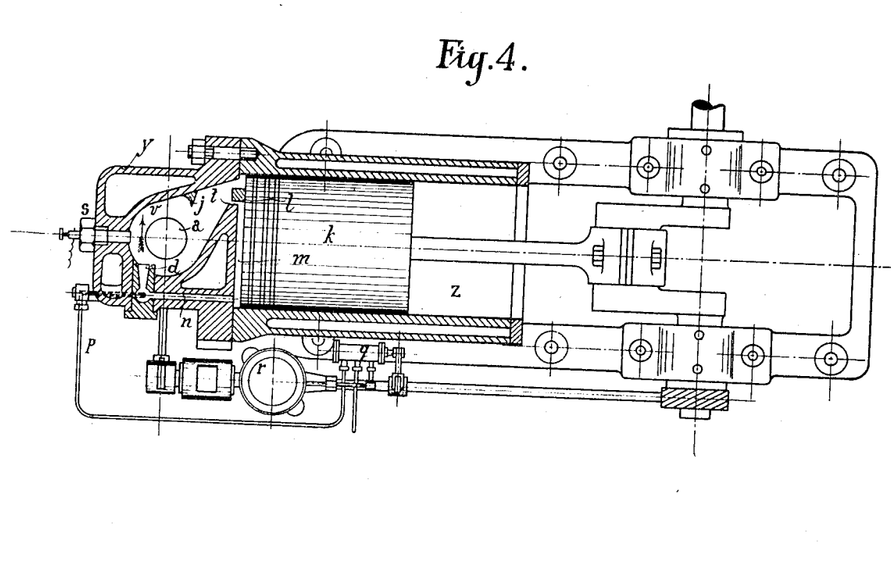
Fig. 4 is a plan view of a four-cycle hydrocarbon engine provided with the improvements according to this invention, the cylinder and its cover being shown in section.

The improvements described may also be applied to four cycle hydrocarbon engines. Fig. 4 shows for instance a so improved four cycle hydrocarbon engine, of which the known parts I need not describe in detail. The piston $k$ is provided with a cross rib $l$, which can work with the edge $t$ of the cover $y$ for dividing the compressed air in a similar manner as described before. The space $m$ thus formed is equally put in communication with the nozzle $d$ through a channel $n$. The greater part of the combustion chamber $v$ is cylindrical and the nozzle $d$ is shown as disposed eccentrically for the purpose of forming a whirl within the chamber $v$ and thereby better mixing the combustible with the compressed air. To promote the formation of a whirl a projection $j$ may be provided. The combustible is in this case supplied from a pump $q$, which is in any known manner controlled from the governor $r$ so as to furnish the combustible in an adjusted quantity during the outward stroke or the inward stroke or at the moment when compressed air is forced out of the space $m$ through the nozzle $d$.

This engine operates as follows: During the first piston stroke outwards (from left to right) the piston $k$ sucks air through the air-inlet valve (not shown) and during the second stroke inwards it compresses the air, which before the end of the stroke is divided by the rib $l$, so that the air contained in the space $m$ will be strongly compressed and on escaping through the channel $n$ it will inject the combustible in the direction of the arrow into the less compressed air within the chamber $v$. The intimate mixing of the combustible with the compressed air is further promoted by the whirl and the mixture is ignited, either by the electrical igniter $s$ or owing to the high temperature produced by the compression of the air. During the third piston stroke outwards the burning or exploding mixture will perform its work and during the fourth piston stroke inwards the waste gases are expelled through the opened outlet valve $a$ as usual.

The hydrocarbon engine may be varied in many respects without departing from the spirit of my invention. A few examples of modifications of the engine I will now proceed to describe in detail without paying any regard to the kind of the hydrocarbon engine, i. e. whether it be operated on the two-cycle principle or in the four cycle manner. The known parts of the engine, such as valves, valve gears, pump, shafts, frames etc. will be omitted, while only the parts in connection with the subject matter of my invention, such as the communicating channel $n$, the combustion chamber $v$, the supply of the combustible and the time and manner of the injection will be taken into consideration.

Figure 5:
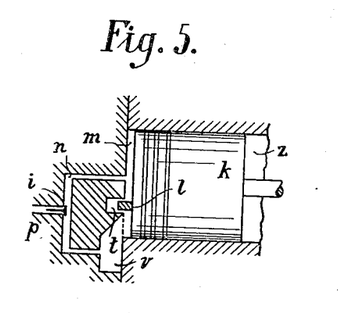
Fig. 5 is a longitudinal section showing a modified form of the inlet passage.

In Fig. 5 the cross rib $l$ on the piston $k$ is shown as arranged to engage in recess $t$ of a rectangular cross section. The combustion chamber $v$, which may be disposed for instance laterally, is connected with the space $m$ by means of a channel $n$, into which the combustible furnished by a pump or the like is introduced at the proper moment through a channel $p$ and the opened valve $i$. From the moment, at which the cross rib $l$ commences to engage in the recess $t$, the more strongly compressed air passing over from the space $m$ through the channel $n$ will take along with it the combustible and inject it into the chamber $v$.

Figure 6:
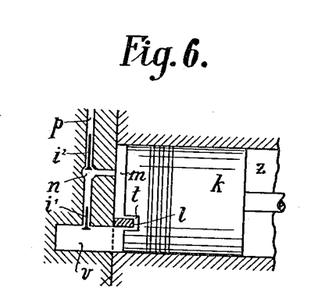
Fig. 6 is a similar view showing a further modification in which the step is formed on the cover.

The cross rib $l$ may be disposed on the cover $y$ instead of on the piston $k$ and it may be arranged to engage in a recess $t$ in the piston, see Fig. 6. The effect will be exactly the same as before.

Valves controlled from the crank shaft may also be used for admitting the combustible. In Fig. 6 a valve $i^2$ is for instance shown for admitting the combustible from the channel $p$ to the communicating channel $n$ during the first piston stroke in four cycle engines or during the exhaust piston stroke in two-cycle engines, and the combustible is allowed to stand above the second valve $i^1$, which under the pressure of the compressed air in the space $m$ or under the action of some moving part of the engine is opened, whereupon the combustible is injected into the combustion chamber $v$.

Figure 7:
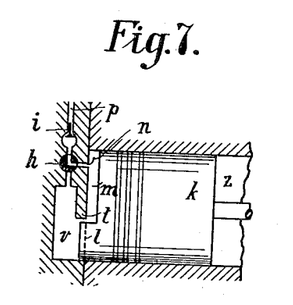
Fig. 7 is a similar view showing a still further modification.

The cross rib $l$ on the piston $k$ may be formed as a step of segmental section in the cross direction of the cylinder, see Fig. 7, in which case the effect will be much the same as in Fig. 2. Fig. 7 also shows a modification of the supply of the combustible, a cock $h$ with a bent channel being inserted in the crossing point of the channel $n$ and the tube $p$. In the position shown it collects the combustible coming from the tube $p$ through the opened valve $i$ and at the moment, when the step $l$ divides the compressed air the cock $h$ is so reversed, as to put the chamber $m$ in communication with the combustion chamber $v$, so that the combustible is injected as before.

Figure 8:
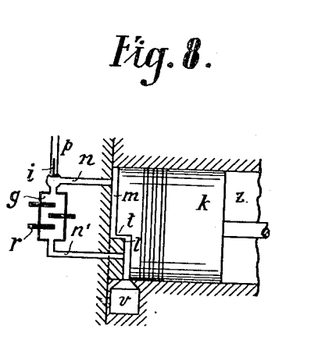
Fig. 8 is a similar view showing a further modification.

The step $l$ in Fig. 7 may also be disposed on the cover $y$, while the piston $k$ is provided with a recess to fit this step as is shown at Fig. 8. The effect will be the same as before. Fig. 8 also shows a further modification of the supply of combustible, a gasifier $g$ being inserted in the channel $n$ $n^1$ and if necessary provided with heating ribs $r$. The gasifier $g$ may be disposed in the cover $y$ or in the combustion chamber $v$ or without, and it may be covered with heat non-conducting material or it may be heated by the heat of the several explosions, or by waste gases or by means of a special burner, the same as in the ordinary known hydrocarbon engines. The combustion chamber $v$ is for instance shown in the cylinder wall or on the same and the channel $n^1$ connects this chamber $v$ and the gasifier $g$.

Figure 9:
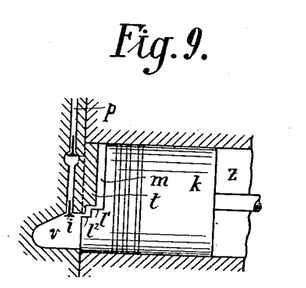
Fig. 9 shows a form in which the piston is stepped at the end.

The step $l$ in Fig. 7 may have a recess $l^2$ in Fig. 9 and thereby be turned into two steps and the cover $y$ will in this case be shaped accordingly. The compressed air will be compelled to escape from the space $m$ through the narrow slits between the two steps $l^1$ $l^2$ and the corresponding faces $t$ to the combustion chamber $v$. At the moment at which the two steps $l^1$ $l^2$ commence to pass along the faces $t$, the combustible is forced through the valve $i$ by means of a pump or otherwise and the compressed air escaping from the slits at $l^2$ will meet the combustible and nebulize it in the chamber $v$.

Figure 10:
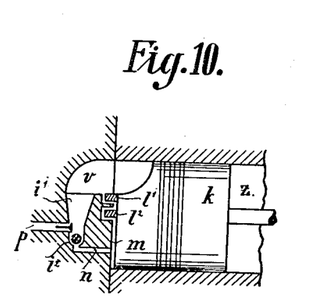
Fig. 10 shows an arrangement in which the piston is provided with two spaced steps.

The cross rib $l$ in Figs. 1 to 6 may also be double or it may be multiplied. Fig. 10 shows for instance two parallel cross ribs $l^1$ and $l^2$, between which a rib on the cover $y$ engages. In this figure also another manner of storing up the admitted combustible is shown. During the suction period in the four cycle engine or during the exhaust period in the two-cycle engine the combustible is forced from the tube $p$ through the valve $i^1$ direct into the combustion chamber $v$, either by a pump or under the head of a column in case a reservoir is placed sufficiently high above the engine. The admitted combustible collects in the space above a valve $i^2$, which may be for example a ball as shown. As soon as the two cross ribs $l^1$ and $l^2$ on the piston $k$ engage in the respective recesses of the cover $y$, the air within the space $m$ becomes strongly compressed, so that it lifts the valve $i^2$ and injects the combustible into the compressed air in the chamber $v$. The valve $i^2$ may be loaded or balanced. Instead of being lifted by the compressed air, this valve may be actuated mechanically or electrically in some known manner or it may be replaced by a cock or slide controlled from the engine. Of course the lower part of the combustion chamber $v$ may be formed as a nozzle or it may contain a nozzle such as $d$ in Figs. 2, 3 and 4.

Figure 11:
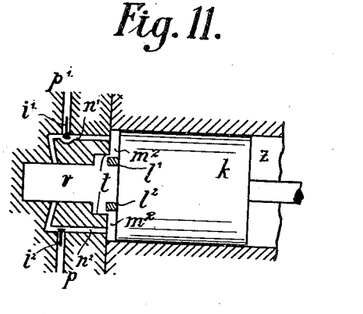
Fig. 11 illustrates a still further modified form.
Figure 12:
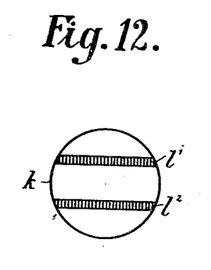
Fig. 12 is an end view of the piston shown in Fig. 11.

As is shown at Fig. 11, the piston $k$ may have two parallel cross ribs $l^1$ and $l^2$ (see the end view in Fig. 12) for dividing the compressed air into three parts, of which the one fills the combustion chamber $v$ and the two other parts fill the two spaces $m^1$ and $m^2$. In accordance with this two channels $n^1$ and $n^2$ are disposed for connecting the combustion chamber $v$ with the two spaces $m^1$ and $m^2$ respectively and require two supply tubes $p^1$ and $p^2$ and two valves $i^1$ and $i^2$. The two jets of combustible so produced in the chamber $v$ may meet each other and thus further their nebulization.

Figure 13:
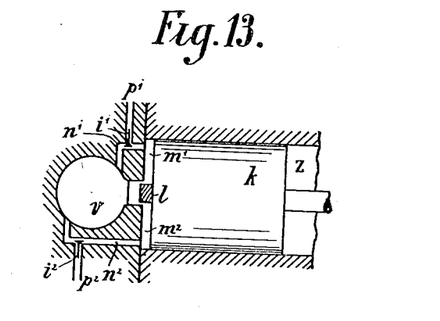
Fig. 13 is a longitudinal section of a further modified form of engine constructed according to the invention.

On putting together the two parallel cross ribs $l^1$ and $l^2$ of Fig. 11 in the middle of the piston $k$ a single cross rib $l^3$ in Fig. 13 will be produced, which divides the compressed air into three parts, the same as before, as there are two spaces $m^1$ and $m^2$ communicating with the combustion chamber $v$ through the two channels $n^1$ and $n^2$.

Figure 14:
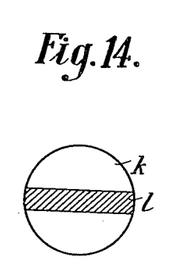
Fig. 14 is an end view of the piston shown in Fig. 13.

A communicating channel $x$ between the two spaces $m^1$ and $m^2$ may also be disposed in the piston $k$ as in Fig. 13 or in the cross rib $l^3$, either in the middle or at the edge at $x^1$ as in Fig. 14, or in the cover $y$ (not shown, as it is obvious how to dispose it). In this case a single channel $n^1$ connecting either space with the combustion chamber $v$ and containing the valve $i^1$ will suffice, as will be seen from Fig. 13. A similar arrangement may be made in Fig. 11.

Figure 15:
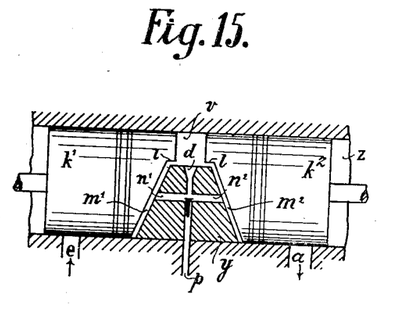
Fig. 15 is a longitudinal section of an engine in which two pistons are employed.

The improvements according to my invention may also be applied to hydrocarbon engines with two pistons in the same cylinder and working in opposite directions. Fig. 15 represents an improved two-stage engine of this kind, in which the piece $y$ in the middle of the cylinder $z$ is an equivalent of the covers $y$ of two cylinders $z$ of the kind described above which are put together. This piece $y$ is provided with two communicating channels $n^1$ and $n^2$ besides the common supply tube $p$ and the common nozzle $d$. The steps $l$ of the two pistons $k^1$ and $k^2$ are arranged to divide the compressed air into three parts, the one of which is in the combustion chamber $v$ and the two other parts are in the two spaces $m^1$ and $m^2$. The more strongly compressed air passes from the two spaces $m^1$ and $m^2$ through the two channels $n^1$ and $n^2$ respectively and injects the combustible admitted through the nozzle $d$ into the combustion chamber $v$. Before the two pistons reach the ends of their outward strokes, the one piston $k^2$ uncovers the outlet $a$ through which the waste gases escape, and the other piston $k^1$ uncovers the inlet $e$, through which fresh air enters the cylinder, whereupon it expels the rest of the waste gases through the outlet $a$ as usual.

Figure 16:
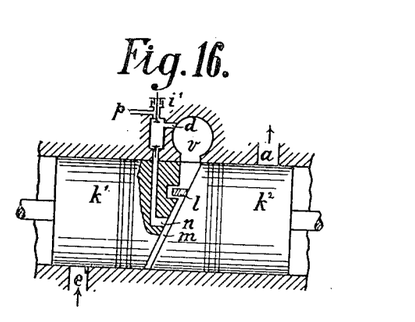
Fig. 16 is a similar view of a somewhat similar form of engine.

The central piece $y$ in Fig. 15 may be omitted, if the two pistons $k^1$ and $k^2$ in Fig. 16 are provided with parallel inclined end faces and either of them is provided with a cross rib $l$, which engages in a recess of the other piston in the manner shown at Fig. 5. During the outward strokes of the two pistons a quantity of combustible is admitted from the supply tube $p$ through the valve $i^1$ into the space above the second valve $i^2$. During the inward strokes of the two pistons $k^1$ and $k^2$ the air contained in the space $m$ and separated from that in the combustion chamber $v$ by the cross rib $l$ will be more strongly compressed and lift the valve $i^2$ and force the combustible through the nozzle $d$ into the combustion chamber $v$. Of course the channel $n$ may also be disposed in the cylinder wall instead of in the piston $k^1$ and it should connect the space $m$ with the combustion chamber $v$.

Figure 17:
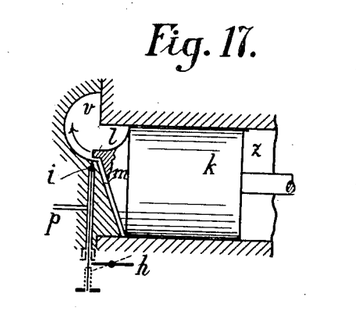
Figs. 17 and 18 are longitudinal sections showing further modifications of the engine.

Following are a few examples to show various manners, in which the combustible may be injected into the combustion chamber. In Fig. 17 the spring-pressed valve $i$ is actuated from the crank shaft in any known manner with the aid of a lever $h$ to admit the combustible from the supply tube $p$ under the pressure produced by a pump (not shown) or otherwise into the combustion chamber $v$. This takes place during the period in which the compressed air separated by the cross rib $l$ is further compressed in the space $m$ and escapes through the slit between the rib $l$ and the edge of the cover $y$ to meet the combustible in the direction of the arrow and to nebulize it.

Figure 18:
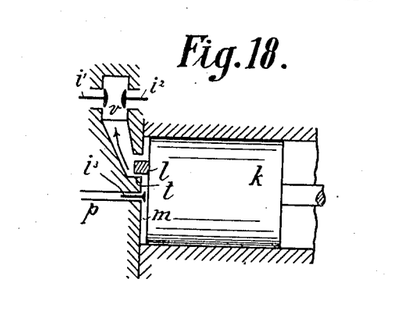
Figure 19:
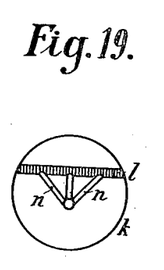
Fig. 19 is an end view of a modified form of piston.

The combustible may be introduced into the space $m$, see Fig. 18, say at the moment, at which the cross rib $l$ commences to pass along the edge $t$, a check valve $i^3$ being employed to prevent the admitted quantity of combustible from returning under the pressure of the explosion. Special grooves $n$ $n$ as in Fig. 19 may be provided either in the end face of the piston $k$ or in the cover $y$ for guiding the combustible while the latter is being injected into the combustion chamber $v$ in the direction of the arrow. $i^1$ and $i^2$ denote the air-inlet valve and the outlet valve respectively, the figure representing a four cycle hydrocarbon engine.

Figure 20:
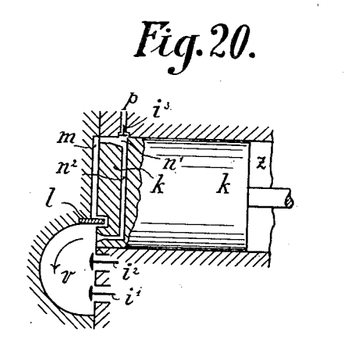
Figs. 20—26 are longitudinal sections showing further modifications.

The communicating channels may also be disposed in the piston instead of in the cover, as $n^2$ in Fig. 20. This channel $n^2$ may communicate with the space $m$ through a groove $n^1$ close to the inside of the cylinder $z$ and it may be arranged to receive the combustible from the supply tube $p$ through the opened valve $i^3$ and to inject it into the combustion chamber $v$. The cross rib $l$ is shown as disposed on the cover $y$ and arranged to engage in a recess of the piston $k$.

Figure 21:
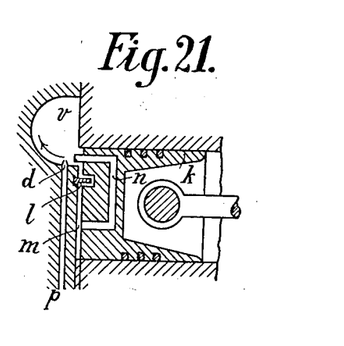

In Fig. 21 the communicating channel $n$ (disposed in this case in the piston $k$) serves merely for conducting the highly compressed air, which is forced out of the space $m$ and meets the jet of combustible injected from the mouth $d$ of the tube $p$ and nebulizes it in the combustion chamber $v$. It is obvious, that the channel $n$ may also be disposed in the cover $y$ or in the wall of the cylinder $z$, the essential point being, that it connects the space $m$ with the combustion chamber $v$ and is so disposed, that the jet of the compressed air meets and nebulizes that of the combustible.

Figure 22:
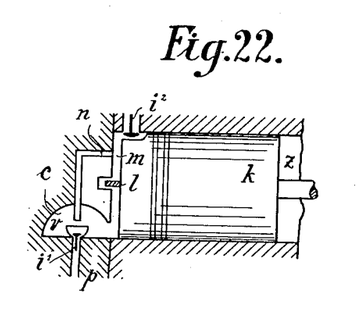

In Fig. 22 a chamber $v$ is shown above the valve $i^1$, so that the combustible admitted from the supply tube $p$ collects in the chamber $v$. The highly compressed air conducted from the space $m$ through a channel $n$ in the cover $y$ meets the combustible and blows it out of the chamber $v$ into the compressed air in the chamber $v$. This channel $n$ may also be disposed in the piston somewhat as shown in Fig. 21.

Finally I may repeatedly point out the essential modifications of the hydrocarbon engine: The combustion chamber $v$ may have the most various shapes and dispositions, as partly already shown in the figures. It may be globe-shaped, cylindrical, prismatic, or otherwise shaped. It may be disposed in the cylinder, in the cover or even in the piston, either axially or laterally or otherwise. It may be cooled wholly or partly with water or air, or it may be heated, especially for starting the engine. Several combustion chambers may be disposed for a single cylinder, or a single combustion chamber may be disposed for several cylinders.

The communicating channel $n$ may be single or multiplied and it may be disposed in various other manners than hitherto shown. It may lead into the combustion chamber $v$ in the most various directions. If there are several communicating channels disposed, either of them may conduct the combustible and the others only the air. Preferably they are so disposed that the jets meet each other.

Valves (or cocks, slides), either mechanically actuated or closed under the pressure of the compressed air coming from the space $m$ may be disposed at any place in the communicating channel $n$ for the purpose of retaining the combustible (vide for instance Figs. 6, 7, 9 and 10) or of preventing air from returning from the combustion chamber $v$ to the space $m$ during the explosion, or if in four stroke cycle engines they are closed at the end of the exhaust period, they serve for preventing the wasted gases from passing through the channel $n$.

The combustible may be admitted at any moment during a piston stroke, as already mentioned above, the essential point being, that at the given moment, when the compressed air passes from the space $m$ to the combustion chamber $v$, the combustible be presented to the air in the proper manner to be taken along with by the same. The many various manners in which this may be effected are obvious to any one versed in the art to which this invention appertains.

A special arrangement may be mentioned here, which may be considered to be so to say the reverse of the method hitherto adopted. Obviously the passage of the compressed air from the space $m$ to the combustion chamber $v$ will take place during the period from the moment at which the cross rib $l$ engages in the recess $t$ until the piston $k$ reaches its extreme position, after which air will return during the following piston stroke from the combustion chamber $v$ to the space $m$, so that the combustible following it will burn in the space $m$. To prevent this, valves are preferably inserted in the communicating channels $n$, if there are any, and these valves are mechanically actuated or they automatically prevent the air from passing from the space $m$ to the combustion chamber before the change of stroke. This method may also be combined with the previous one in that the combustible is injected into the combustion chamber $v$ before the change of stroke and into the space $m$ after the said change.

The new improvements may also be utilized for injecting into a mixture of air and combustible, which is not yet inflammable, a further quantity of combustible in order to render it inflammable. Various kinds of combustible may be simultaneously employed.

With the aid of the new improvements also water, steam and other materials may be injected for various purposes (for instance the regulation of the work).

The ignition of the mixture may be effected in various manners, be it by means of an electrical igniting device ($s$ in Figs. 2 and 4) or a magnetic igniter, or a glowing tube etc. as usual. Also the gasifier shown in Fig. 8 may serve as an igniter. In case the communicating channel $n$ is formed in a tube which leads from the space $m$ to the nozzle $d$ or the combustion chamber $v$ respectively, this tube may be heated or made to glow for igniting the mixture. The ignition may also be effected with glowing bodies introduced into the combustion chamber or by means of pyrophoric or catalytic materials. In case the compression of the air produces a sufficiently high temperature, or in case the cylinder has been heated to the required degree, the mixture will ignite itself, so that the above named igniting devices need be used only for starting the engine.

In certain cases it may be preferable to cause the jet of combustible or the mixture of air and combustible to meet a hot wall or the like to be thereby ignited. The said hot wall or the like, such as the projection $j$ in Fig. 4, may at the same time serve for guiding the jet of combustible. If this hot wall, the shape of which is immaterial, is made detachable, it can be made to glow before starting the engine and may serve for igniting the mixture.

The nozzle $d$ or the part of the communicating channel $n$ terminating in the combustion chamber $v$ may be varied in many respects. For example spray nozzles, injectors, union-jet burners, nozzles with dashing pins or nozzles with alternating partitions may be used for nebulizing and mixing the combustible with the air from the space $m$, also with the air in the combustion chamber $v$. Such parts may also be disposed without the nozzle $d$.

The introduction of the combustible into the engine, for example through the nozzle $d$, may be effected with the aid of a pump or other forcing means, or under the pressure of a head, the combustible reservoir being placed high above the cylinder. In case of four stroke cycle engines the combustible may be sucked into the cylinder during the suction period.

Returning to the invention proper, i. e. the rib or the step or in general a distributing partition wall $l$ may here mention a few further special modes of execution of the same.

Figure 23:
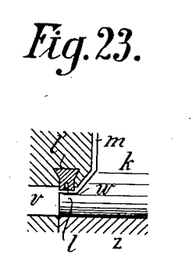
Figure 24:
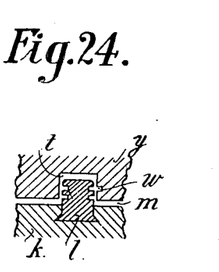

A replaceable ledge $l^1$, if necessary provided with a stuffing groove $w$, may be disposed in the cover y opposite to the longitudinal face of the cross rib or step l (see Fig. 23 and compare with it Fig. 7), say for better stuffing the slit or for adjusting this slit. The said ledge l¹ could also be disposed on the cross rib or step l. The cross rib l shown in Figs. 5 and 6 or the recess t may be provided with stuffing grooves w for a similar purpose, see Fig. 24.

Figure 25:
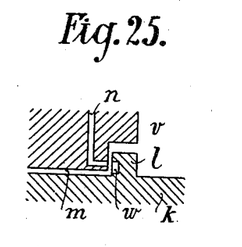
Figure 26:
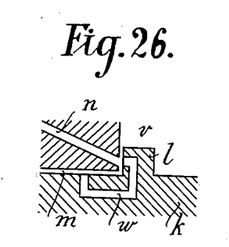
Figure 27:
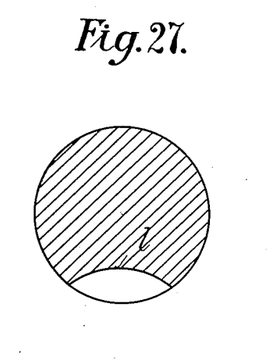
Figs. 27—30 are transverse sections of different forms of pistons constructed according to the invention.
Figure 28:
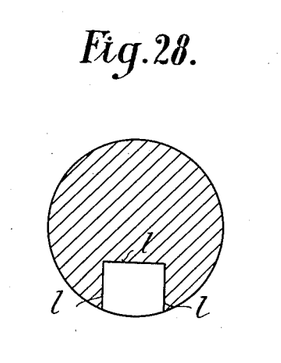
Figure 29:
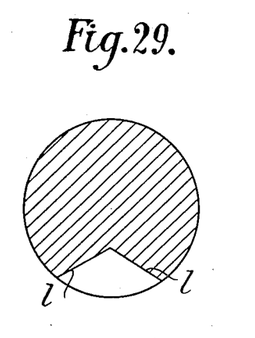
Figure 30:
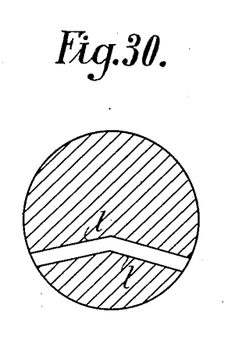

If it is desired to obtain a greater quantity of compressed air from the space m, this may be effected by increasing the height of the cross rib or step l in the longitudinal direction of the cylinder. In this case the injection of the combustible will commence at an earlier moment, which may sometimes be not desirable. To prevent this, the communicating channel n may be so disposed, that it is opened by the cross rib or step l a little later. This may be effected for example in the manner illustrated in Fig. 25, where the cross rib l is provided with a groove w and the communicating channel n terminates in the longitudinal face of the recess, so that the cross rib l during the motion of the piston first nearly closes the mouth of the channel n and afterwards shortly before the change of stroke uncovers the channel n, when the highly compressed air will pass from the space m through the groove w and the channel n to the combustion chamber v. In Fig. 26 the groove w is replaced by a channel w in the piston.

Although for practical reasons the straight cross rib or step l, see Figs. 1, 12, 14 and 19, will be preferable, yet for the sake of completeness I may state, that the rib or step l may also be bent or broken, as is shown at Figs. 27 to 30, which require no further explanations.

At last I may remark, that all the various modes of execution of the several parts described above and shown in the figures may be combined in most various manners, also that the hydrocarbon engine may be horizontal or vertical, single-acting or double-acting, in series, etc.

What I claim as my invention, and desire to secure by Letters Patent, is—

1. In a hydrocarbon engine, the combination, with the combustion-chamber and the fuel-receiving chamber communicating therewith, of a piston, means for supplying fuel to said fuel-receiving chamber, and coöperating means on said piston and the cover of the cylinder whereby the compressed air is divided and part of the same utilized to blow in the fuel charge from the fuel-receiving chamber.

2. In a hydrocarbon engine, the combination, with the combustion-chamber, the fuel-receiving chamber, and the piston, of coöperating means on the piston and the cover of the cylinder, embodying a step formed on one of said parts, whereby the compressed air is divided and a part so divided is used to blow in the charge from the fuel-receiving chamber.

3. In a hydrocarbon engine, the combination, with the combustion-chamber, fuel-receiving chamber and piston, of means to divide the air compressed by the piston into parts, subjecting the parts to different pressure, and utilizing the part at the greatest pressure to inject the fuel from the fuel-receiving chamber into the combustion-chamber.

4. In a hydrocarbon engine, the combination, with the combustion-chamber, of a fuel-receiving chamber directly communicating therewith, a piston in said combustion-chamber which compresses air in the fuel-receiving chamber, and means whereby a part of the air compressed by the piston is projected through the fuel-receiving chamber to blow the fuel into the cylinder.

5. In a hydrocarbon engine, the combination of a combustion-chamber, a fuel-receiving chamber communicating therewith, a piston in said combustion-chamber, and means whereby the air compressed by said piston is divided into two parts of unequal pressure, the part at low pressure being compressed in the fuel-receiving chamber, and means whereby the part at high pressure is projected through the fuel-receiving chamber, while such other part is compressed therein, to inject the fuel into the combustion-chamber.

6. In a hydrocarbon engine, the combination, with the cylinder, the combustion-chamber, the piston, of coöperating means on the piston and cover of the cylinder whereby the air compressed by the piston is divided into parts one of which is at higher pressure than the other and passes through the combustion-chamber in such a direction as to mix the fuel in the combustion-chamber with the other part of the compressed air.

7. In a hydrocarbon engine, the combination, with the cylinder, the combustion-chamber, the means for supplying fuel to the latter, and the piston, of means for dividing the air compressed by the piston in the cylinder comprising a step carried by one of said parts, a part of the air at one side of said step being compressed in the combustion-chamber, and means for conducting the other part of the air through the combustion-chamber in the direction of the cylinder.

8. In a hydrocarbon engine, the combination, with the cylinder, the combustion-chamber, the means to supply fuel to the latter, and the piston in said cylinder, of a step carried by the piston which divides the compressed air into two parts one of which is at lower pressure than the other and compressed in the combustion-chamber, and means for conducting the part at higher pressure through the combustion-chamber.

9. In a hydrocarbon engine, the combination, with the cylinder, the combustion-chamber, the means for supplying fuel to the latter, and the piston in said cylinder, of a step carried by the piston which divides the air compressed thereby into two parts one of which is in the combustion-chamber and consequently at lower pressure than the other part, and a channel to lead the air at high pressure to the combustion-chamber at the rear thereof.

10. In a hydrocarbon engine, the combination of a cylinder, a piston, means for supplying air to said cylinder at one side, a combustion-chamber in communication with said cylinder at one end, means for supplying fuel to said combustion-chamber, a step on said piston which divides the compressed air into two parts and also deflects the incoming air, and means for conducting that part of the compressed air which is not compressed within the combustion-chamber through such chamber.

11. In a hydrocarbon engine, the combination, with the cylinder and the piston therein, of a combustion-chamber in direct communication with the cylinder at one end of the latter, means for supplying fuel to said combustion-chamber, means carried by said piston whereby the compressed air is divided so that a part is compressed in the combustion-chamber, an abutment between which and the piston the other part of the air is compressed at higher pressure, and means to conduct such last-named part of the air to the combustion-chamber at such a point that the fuel will be mixed with the air of lower pressure and blown into the cylinder.

In testimony whereof I have signed my name to this specification in the presence of two subscribing witnesses.

FRIEDRICH AUGUST HASELWANDER.

Witnesses:
CASIMIR VON OSSOWSKI,
JEAN GRUND.